United States Patent

Suzuki et al.

[11] Patent Number: 5,513,026
[45] Date of Patent: Apr. 30, 1996

[54] METHOD OF PRODUCING A LIQUID CRYSTAL DISPLAY WITH A SPACER

[75] Inventors: Takumi Suzuki, Atsugi; Reiko Kameyama; Sumio Kamoi, both of Yokohama; Hisashi Kikuchi, Atsugi; Satosi Komori, Yamato; Tomomi Suetake, Isehara; Yumi Matsuki, Yamato, all of Japan

[73] Assignee: Ricoh Company, Ltd., Tokyo, Japan

[21] Appl. No.: 389,216

[22] Filed: Feb. 15, 1995

Related U.S. Application Data

[62] Division of Ser. No. 182,401, Jan. 18, 1994.

[30] Foreign Application Priority Data

| Jan. 18, 1993 | [JP] | Japan | 5-5521 |
| Jan. 29, 1993 | [JP] | Japan | 5-13654 |
| Aug. 24, 1993 | [JP] | Japan | 5-209139 |

[51] Int. Cl.⁶ ............................................... G02F 1/1339
[52] U.S. Cl. ............................................................ 359/81
[58] Field of Search ..................................... 359/81, 87, 57

[56] References Cited

U.S. PATENT DOCUMENTS

| 4,156,558 | 5/1979 | Grumet | 359/81 |
| 4,971,829 | 11/1990 | Komura et al. | 427/27 |
| 5,029,985 | 7/1991 | Suzuki et al. | 359/81 |
| 5,220,446 | 6/1993 | Rho | 359/81 |

Primary Examiner—Anita Pellman Gross
Assistant Examiner—James A. Dodek
Attorney, Agent, or Firm—Oblon, Spivak, McClelland, Maier & Neustadt

[57] ABSTRACT

In a liquid crystal display device (LCD), a spacer is interposed between an upper and a lower substrate implemented by flexible films. Liquid crystals are confined in the gap between the two substrates. The spacer is scattered in the crystals at a density higher than $20/mm^2$ and lower than $800/mm^2$. The device allows a minimum of bubbles to be produced in the crystals without resorting to gas barrier coatings or similar conventional implementation against bubbles. When the spacer is sprayed, it is uniformly distributed to set up a uniform cell gap. The device is, therefore, free from display speckles and other defects and inexpensive.

5 Claims, 4 Drawing Sheets

METHOD OF PRODUCING A LIQUID CRYSTAL DISPLAY WITH A SPACER

This is a Division, of application Ser. No. 08/182,401 filed on Jan. 18, 1994, still pending.

BACKGROUND OF THE INVENTION

1. Field of the Invention

The present invention relates to a liquid crystal display device (LCD)using flexible films, and a method of producing the same. More particularly, the present invention relates to an LCD which allows, despite a low gas barrier capability, a minimum of bubbles to be produced in liquid crystals intervening between polymer film substrates and distributes, when a spacer is sprayed, the spacer uniformly enough to set up a uniform cell gap, thereby achieving a desirable display characteristic free from noticeable color speckles, coloring, etc. The present invention is also concerned with a method of fabricating such an LCD.

2. Discussion of the Background

Japanese Patent Laid-Open Publication (Kokai) No. 61-15128, for example, proposes an LCD having substrates implemented by polymer films. One of the substrates has high resistivity to heat and liquid crystals while the other substrate has low air permeability. This kind of configuration prevents bubbles from being easily formed in a liquid crystal layer. Let this conventional LCD be referred to as Prior Art 1.

A polymeric spacer substance may be sprayed to between the substrates or polymer films such that it occupies 1% to 30% of the entire display area when projected onto the display area, as proposed in Japanese Patent Laid-Open Publication No. 60-159727 (referred to as Prior Art 2 hereinafter). In this case, the spacer sets up a uniform gap between the substrates to cause a minimum of speckles to occur.

Japanese Patent Laid-Open Publication No. 64-78227 discloses an LCD in which a spacer in the form of true spherical plastic beads, silica beads or alumina beads is sprayed onto polymer film substrates undergone alignment treatment (referred to as Prior Art 3 hereinafter). The spacer has a standard particle size deviation of less than 0.3 μm and a scattering density of 100 particles to 200 particles/mm$^2$. As a result, the cell gap accuracy is improved to reduce color speckles.

Further, Japanese Patent Laid-Open Publication No. 1-241523 teaches an LCD using substrates also implemented by polymer films, and a spacer whose standard particle size deviation is less than 0.3 μm; the spacer is a mixture of spherical particles scattered at a density of 100 particles to 200 particles/mm$^2$ and glass fibers scattered at a density of five fibers to thirty fibers/mm$^2$ (referred to as Prior Art 4). This kind of spacer insures a uniform cell gap and, therefore, reduces color speckles.

Prior Arts 2–4 each implements substrates with polymer films which are more resistive to shocks and impacts than glass substrates. However, the problem with polymer films is that the gas barrier capability is low. When the polymer films are left in a hot and humid environment over a long period of time, gasses sequentially permeate and penetrate the films and dissolve in the liquid crystal layer to produce bubbles. The bubbles to degrade the display are apt characteristic of the LCD.

In light of the above, Prior Art 1 includes means for enhancing the gas barrier property of the substrates. Substrates with gas barrier coatings, e.g., PC (Poly Carbonate) or PAR (Poly Arylate) substrates or PES (Poly Ether Sulfone) substrates having a composite gas barrier film mainly constituted by EVA (Ethyrene Vinyl Acetate copolymer resin) on the top and bottom thereof have air permeability of 1 to 10 ml/m$^2$/24 h/atm/20° C. With such substrates having low air permeability, it is possible to reduce bubbles to occur in the liquid crystal layer. However, even these kinds of substrates allow gasses to sequentially permeate them as time elapses and are, therefore, apt to suffer from bubbles. In addition, the gas barrier films formed on the top and bottom of the substrates increases material and production costs.

Another problem with Prior Arts 2–4 is that a charge is apt to deposit on the polymer films or substrates. Particularly, the polymer films are noticeably charged during a rubbing step. When the spacer is sprayed onto such charged substrates, the distribution thereof is not uniform, i.e., it is aggregated at some portions and practically absent at some portions, resulting in a non-uniform cell gap. Hence, considering even an area as small as 1 mm$^2$, when the spacer distribution is irregular, color speckles occur although the spacer may be deposited in a predetermined amount in such a small area. This is particularly conspicuous when it comes to an STN (Super Twisted Nematic) mode LCD.

Some different approaches, including one taught in Japanese Patent Laid-Open Publication No. 64-88428, are available for dissipating static electricity existing on the surfaces of the substrates to which the spacer is to be sprayed. For example, ionized air may be blown onto the substrates. Even with such is approaches, however, it impossible to fully eliminate the irregular spraying of the spacer.

For conventional spacers, a reference may be made to, for example, U.S. Pat. Nos. 5,029,985, U.S. Ser. No. 233,747 filed Aug. 19, 1988, and U.S. Pat. Nos. 5,067,796 and 5,011,266.

SUMMARY OF THE INVENTION

It is, therefore, an object of the present invention to provide an LCD capable of further enhancing reliability available with a panel including gas barrier films or, in the case of panels which are not required to have high reliability, causing a minimum of bubbles to occur in liquid crystals between polymer film substrates without resorting to gas barrier films, and a method of producing the same.

It is another object of the present invention to provide an LCD capable of causing a spacer to be sprayed in a uniform distribution and, therefore, insuring a uniform cell gap, and a method of producing the same.

It is another object of the present invention to provide an LCD device having a desirable display characteristic free from speckles and other defects, and reducing the cost.

In accordance with the present invention, in an LCD having an upper and a lower substrate implemented by flexible films, a spacer intervening between the upper and lower substrates, and liquid crystals confined between the upper and lower substrates, the spacer is scattered at a density higher than 201/mm$^2$ and lower than 800/mm$^2$.

Also, in accordance with the present invention, in an LCD having at least a pair of polymer film substrates, transparent electrodes formed on each of facing surfaces of the polymer film substrates, an alignment coating covering the transparent electrodes, a spacer intervening between the facing surfaces, and liquid crystals filling a gap between the facing surfaces which is formed when the LCD has edges thereof adhered together, the spacer comprises true spherical particles and is arranged on at least one of the polymer film substrates at a density higher than $30/0.1$ mm$^2$ and lower than $50/0.1$ mm$^2$.

Further, in accordance with the present invention, in a method of producing an LCD having at least a pair of polymer film substrates, transparent electrodes formed on each of facing surfaces of the polymer film substrates, an alignment coating covering the transparent electrodes, a spacer intervening between the facing surfaces, and liquid crystals filling a gap between the facing surfaces which is formed when the LCD has edges thereof adhered together, a step of spraying the spacer to one of the polymer film substrates on which electrodes occupy a greater area than the other polymer film substrate is included.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
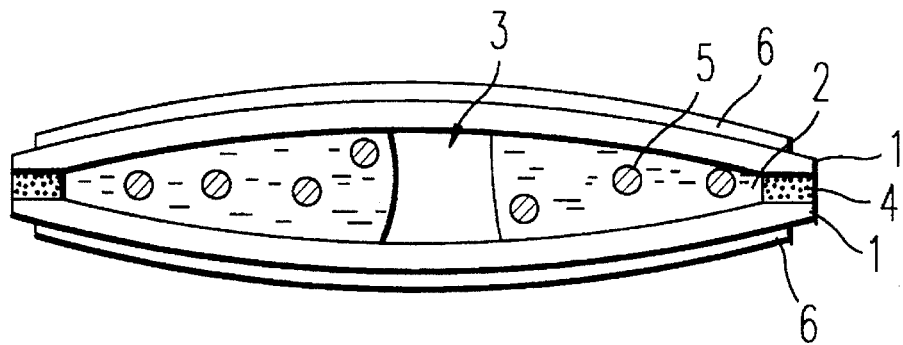
FIG. 1 shows how a bubble grows in a liquid crystal layer of a cell when the cell is deformed in such a manner as to develop vacuum in the crystal layer.

By a series of extended researches and experiments, we found that bubbles are attributable not only to the gas barrier property of substrates but also to the margin of a liquid crystal layer against bubbles, and that the margin depends on the quantity of gasses dissolved in the crystal layer and the deformation of a cell itself. Specifically, while polarizers and substrates expand or contrast depending on the environment, a cell deforms in a bimetal fashion since the expansion and contraction ratio depends on the polarizer and substrate. At this instant, assume that the cell deforms in such a manner as to develop a vacuum in the liquid crystal layer, and bubble cores are produced. Then, as shown in FIG. 1, a bubble 3 present in liquid crystals 2, which are sandwiched between substrates 1, is apt to grow. In FIG. 1, the reference numerals 4, 5 and 6 designate respectively a seal, a spacer, and polarizers. In this condition, when the cell is pressed by, for example, fingers, the substrates are deformed with the result that the cell gap decreases and then increases again. If the increase and decrease in cell gap occur rapidly, bubble cores are produced with the result that bubbles are apt to grow.

Assume that a panel having polarizers adhered to a cell is left in a hot and humid environment. Then, each polarizer including a triacetate film and a polyvinyl alcohol (PVA) layer expands by 0.2%, while each substrate implemented by a polymer film of, for example, polycarbonate, polyester, polyacetate or polyether sulfone expands by about 0.1%. As a result, the polarizers tend to deform with the substrates positioned on the inner periphery thereof. At this instant, since the edges of the cell are restricted by a seal, the cell acts in such a manner as to develop vacuum thereinside, as shown in FIG. 1 in an exaggerated form. When a hard ball, for example, having a diameter of about 10 mm is pressed against the cell with a pressure of 2 kg/cm$^2$ to 3 kg/cm$^2$ for 3 seconds to 5 seconds and then released, the substrate once deforms in such a manner as to reduce the gap and then restores the original position. When the substrate returns to the original position, a vacuum is developed in the cell with the result that bubbles are produced. Generally, as the time elapses, the cell regains the original gap thereof and, therefore, the liquid crystals restore their original pressure, causing the bubbles to disappear. The period of time necessary for the bubbles to disappear depends on the gas dissolution margin of the liquid crystal layer, including the substrates, when the pressure is applied to the cell. If the substrates and polarizers have been deformed to develop a vacuum before the application of a pressure, the above-mentioned period of time increases. To reduce bubbles to occur in such a mechanism, the amount of gasses to dissolve in the liquid crystals may be reduced, or the substrates may be prevented from deforming. The former approach is represented by, for example, conventional gas barrier coatings provided on the substrate. Regarding the latter approach, we found that spraying a spacer in an amount greater than 102 particles/mm$^2$ and smaller than 800 particles/mm$^2$ makes significant contribution.

Further, regarding irregularity in spacer distribution in the spraying step, experiments showed that the amount of charge to deposit on a plastic film substrate, which is inherently easy to charge, depends on the area of electrodes. In addition, the amount of spacer sprayed in the cell gap was controlled in consideration of, for example, the size of stripe electrodes formed on the substrates of a display device for dot matrix display. This was found to eliminate speckles attributable to the sprayed spacer. These findings, as a whole, indicate that as the ITO (Indium Tin Oxide) electrode area increases, the amount of charge decreases to suppress the irregular spacer distribution.

Figure 2A:
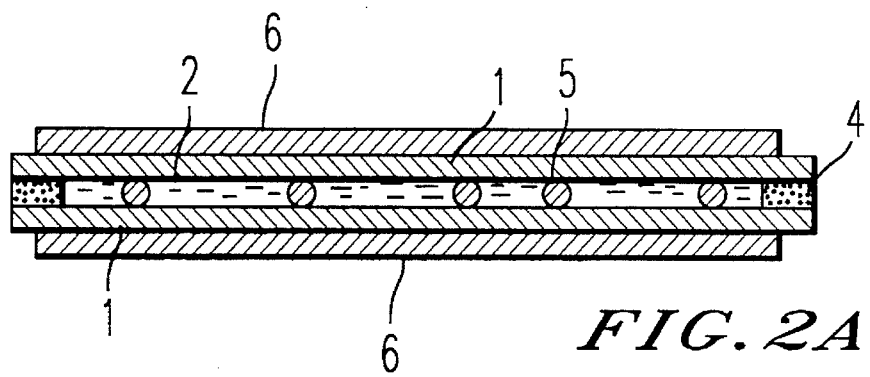
FIG. 2A is a section showing an LCD fabricated for comparison with the present invention.
Figure 2B:
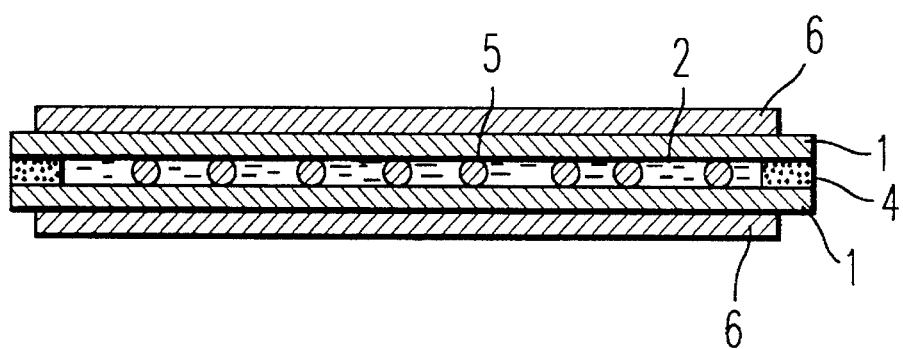
FIG. 2B is a section showing an LCD embodying the present invention.

Referring to FIGS. 2A and 2B, an LCD for comparison and an LCD embodying the present invention, respectively, are shown. As shown, the embodiment and the comparative LCD each has substrates 1. Specifically, the substrates 1 were implemented by 100 µm thick polyester films having ITO coatings (air permeability of 10 ml/m$^2$/24 h/atm/20° C.). A seal 4 was printed on one substrate 1 while a spacer 5 having a particle size of 7.5 µm (e.g. SP2075 available from Sekisui Fine Chemical (Japan)) was sprayed onto the other substrate 1. At this instant, in one sample (embodiment), the spacer 5 was sprayed at a density of 250 particles/mm$^2$ while, in the other sample (comparative device), it was sprayed at a density of 100 particles/mm$^2$. Liquid crystals 2 were injected into each of the two cells, and then polarizers 6 were adhered to the cells to complete panels.

Figure 3:
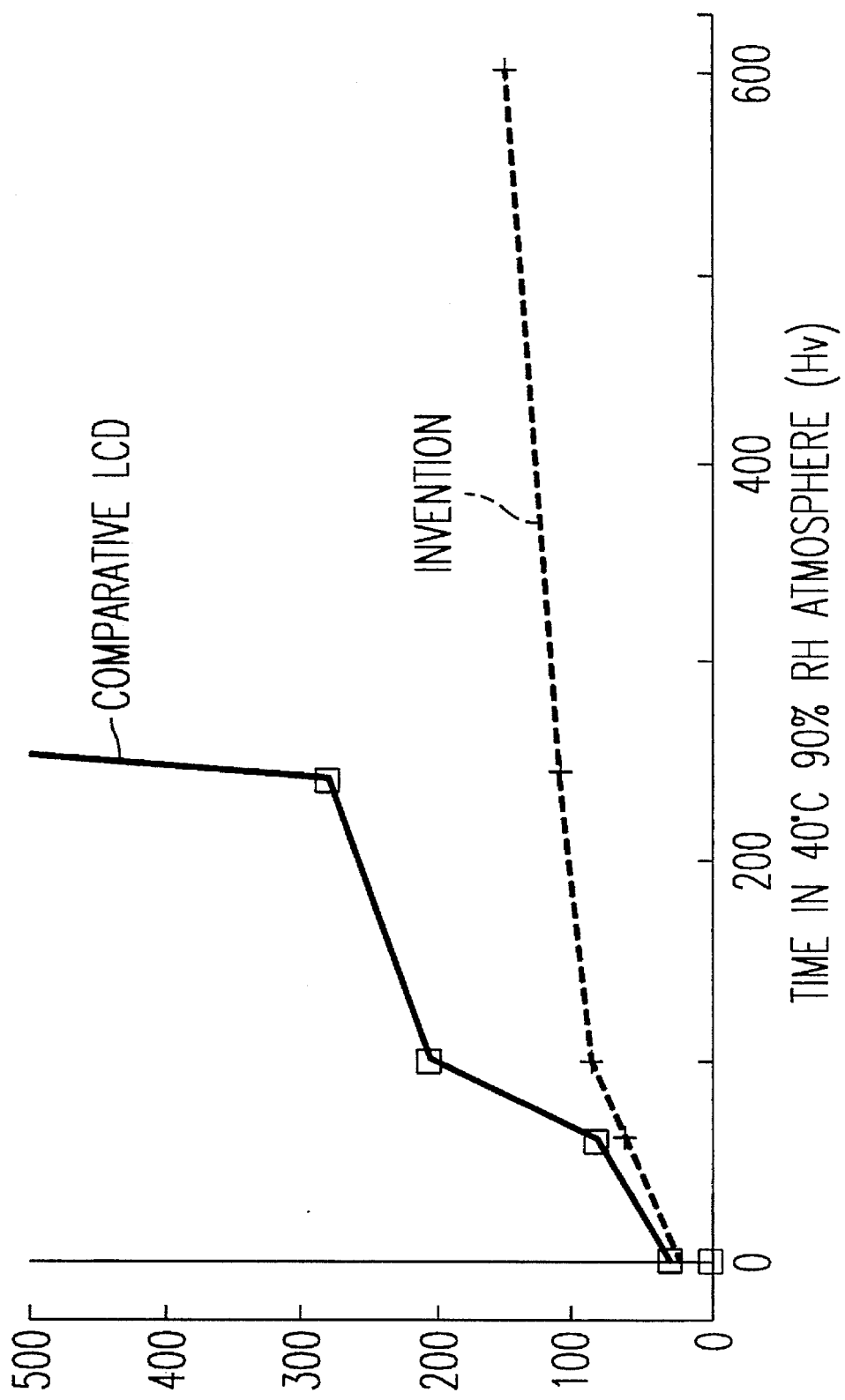
FIG. 3 is a graph showing a relation between the period of time for which the LCD devices shown in FIGS. 2A and 2B are each left in a hot and humid environment and the period of time necessary for bubbles to disappear.

The two panels were each left in a hot and humid atmosphere, i.e., 40° C. and 90% atmosphere with the result that the polarizers 6 were expanded to develop a vacuum in the cell. FIG. 3 is a graph indicative of periods of times needed for bubbles produced in the two panels to disappear.

As the graph indicates, the comparative device causes the period of time to sharply increase in about 100 hours. By contrast, in the embodiment, the period of time increases little even in 100 hours, meaning that the margin against bubbles increases to a noticeable degree.

Figure 4:
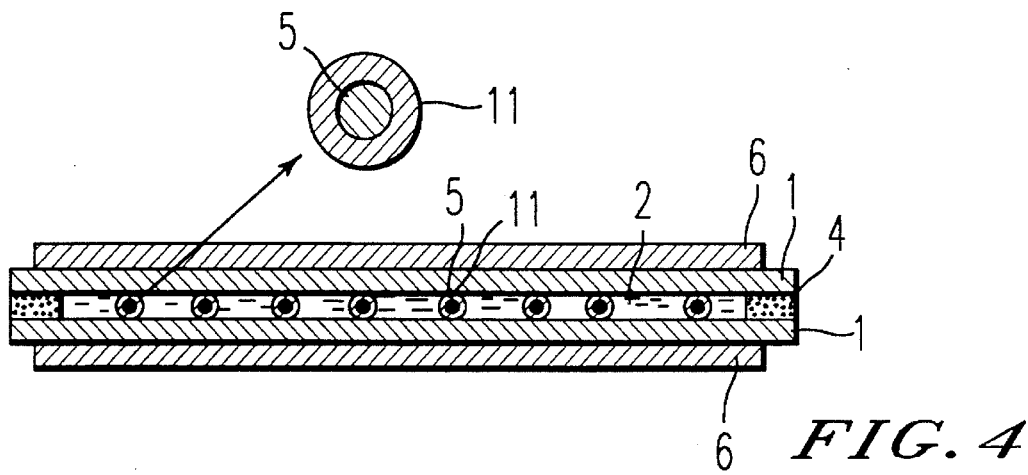
FIGS. 4–6 are sections each showing an alternative embodiment of the present invention.

FIG. 4 shows an alternative embodiment of the present invention in which the spacer 5 is affixed to the substrate 1. In this configuration, the deformation of the substrate 1 is reduced, compared to the case wherein it is not affixed to the substrate 1. This, coupled with the fact that the spacer 5 does not move even when the panel surface is pressed, further reduces the change in cell gap. As a result, the production and growth of bubbles in the liquid crystals 2 are further reduced. Specifically, use is made of an affixing type spacer 5, i.e., a spacer 5 (e.g. SP2075 available from Sekisui Fine Chemical) and a thermoplastic adhesive 11 applied to the surface thereof. After the upper and lower substrates 1 have been adhered to each other, the affixing type spacer 5 is baked when the substrates 1 are baked for sealing.

Figure 5:
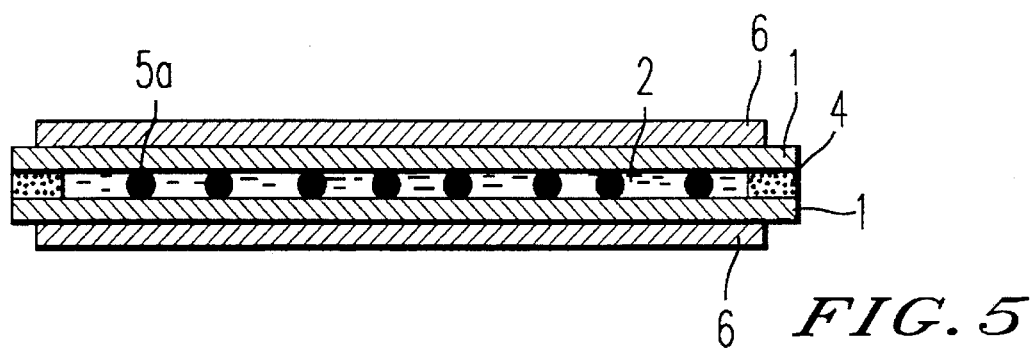

FIG. 5 shows another alternative embodiment which uses a color spacer 5a. The color spacer 5a is advantageous over the non-color spacer 5a in that it can reduce haze even when sprayed in a greater amount. This insures sharp display and, therefore, further improves the display characteristic. Specifically, since the liquid crystal layer is absent at positions where the spacer is present, portions highlighted in black are locally lost due to the spacer, diffusing incident light. The diffusion of light prevents the display from appearing sharp. The greater the amount of spacer, the more the haze is aggravated; when the spacer is sprayed in an amount greater than 200 particles/mm$^2$, haze is conspicuous. The color spacer 5a is successful in eliminating this problem. Specifically, the spacer 5a (e.g. BB2075 available from Sekisui Fine Chemical) was sprayed onto the substrate 1 in the same manner as the previously mentioned SP2075, and then the two substrates 1 were adhered together.

Figure 6:
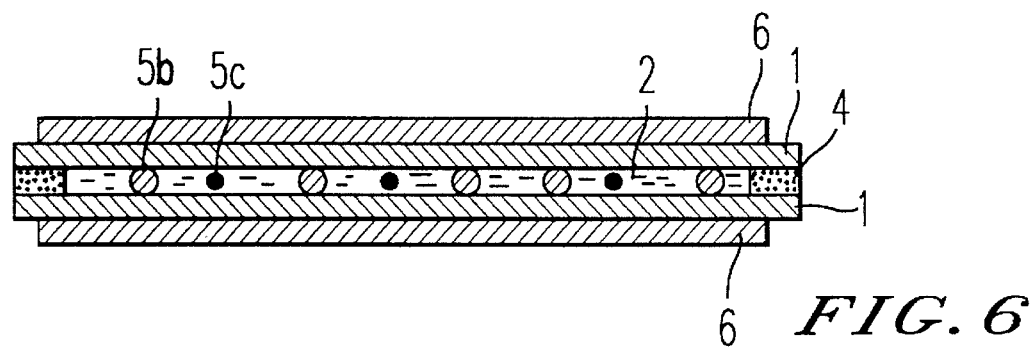

FIG. 6 shows another alternative embodiment of the present invention. As shown, a spacer 5b having a comparatively large particle size and a spacer 5c having a comparatively small particle size are sprayed onto the substrate 1 together. For example, the spacer 5b whose particle size is 7.5 μm is sprayed in an amount of 150 particles/mm$^2$, and then the spacer 5c whose particle size is 6.5 μm is sprayed in an amount of 150 particles/mm$^2$. In this structure, the spacer 5c is shifted to positions where the cell gap is not uniform, thereby setting up a uniform cell gap.

Of course, the crux of the embodiments described above is that the spacer 5 maintains the cell gap uniform. Specifically, the particles implementing the spacer 5 may be replaced with glass fibers or similar fibers. The spacers having diameters of 7.5 μm and 6.5 μm mentioned above cause the thickness of the liquid crystal layer to change little before and after the application of a pressure. Hence, such spacers are advantageous over spacers whose particle sizes are greater than 10 μm in that they reduce the vacuum in the liquid crystal layer and, therefore, further suppress the production of bubbles in the liquid crystal layer.

In accordance with the present invention, the substrates may be provided with air permeability even greater than 10 ml/m$^2$/24 h/atm/20° C. The present invention is, therefore, practicable with both of substrates having air permeability smaller than 10 ml/m$^2$/24 h/atm/20° C. and substrates having air permeability greater than the same.

Assuming a unit area of spacer spray density was 1 m m$^2$, we found that when the spacer is sprayed onto a charged plastic film substrate, which is easy to charge during a rubbing step, the amount of charge depends on the area of electrodes formed on the substrate. The greater the area of transparent electrodes, the smaller the amount of charge is, and vice versa. As a result, the spacer is sprayed onto the substrate in an irregular distribution.

Figure 7:
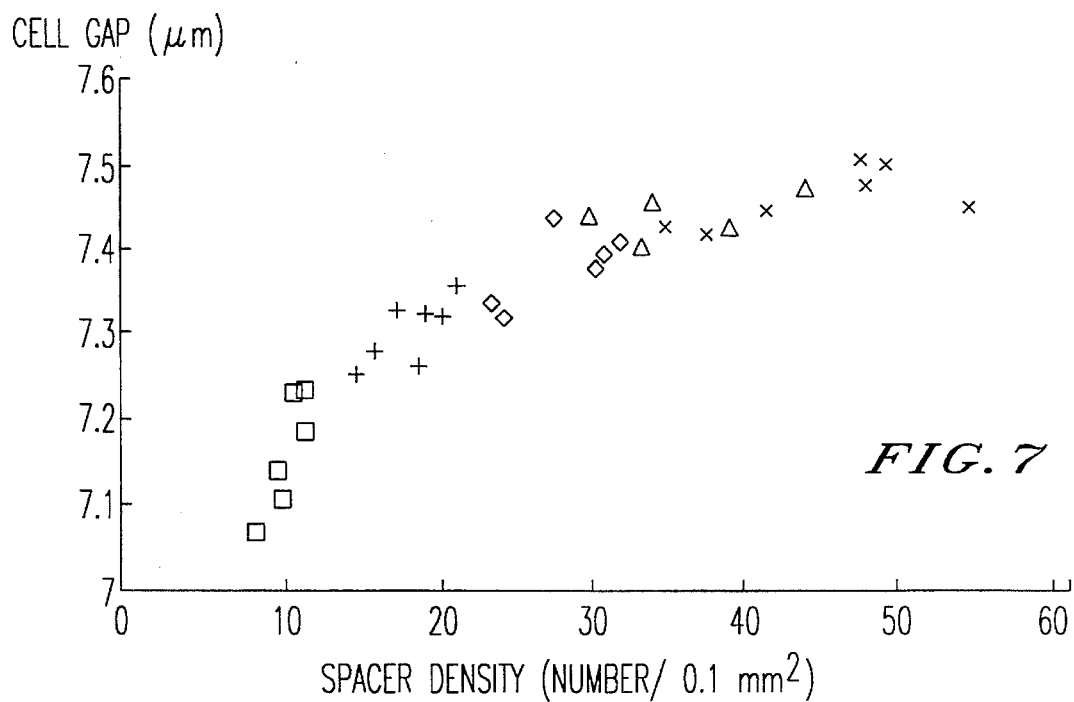
FIG. 7 is a graph indicative of a relation between the spacer spraying density and the cell gap and useful for understanding the present invention.

In a dot matrix display, stripe electrodes formed on an LCD are usually about 0.3 mm wide each. For this reason, as well as other reasons, one dot has an area of 0.3×0.3=0.09 mm$^2$. Therefore, the above-mentioned irregular spacer distribution occurs even in a single dot; if the amount of spacer at a given point is extremely small, the cell gap decreases there and brings about various defects including response speckles and color speckles. FIG. 7 shows a relation between the cell gap and the amount or density of spacer sprayed per 0.1 mm$^2$, which is the area of a single dot, as determined by experiments. For the experiments, the spacer was implemented by true spherical particles of SiO$_2$ having a particle size of 7.4 μm and a standard deviation σ of particle size distribution of 0.2 μm. As FIG. 7 indicates, as the spacer density decreases to below twenty particles/0.1 m m$^2$, the cell gap is noticeably irregular in the corresponding dot; when the spacer density sequentially decreases from twenty particles/mm$^2$ to ten particles/mm$^2$, the cell gap sharply decreases to below the particle size.

Figure 8:
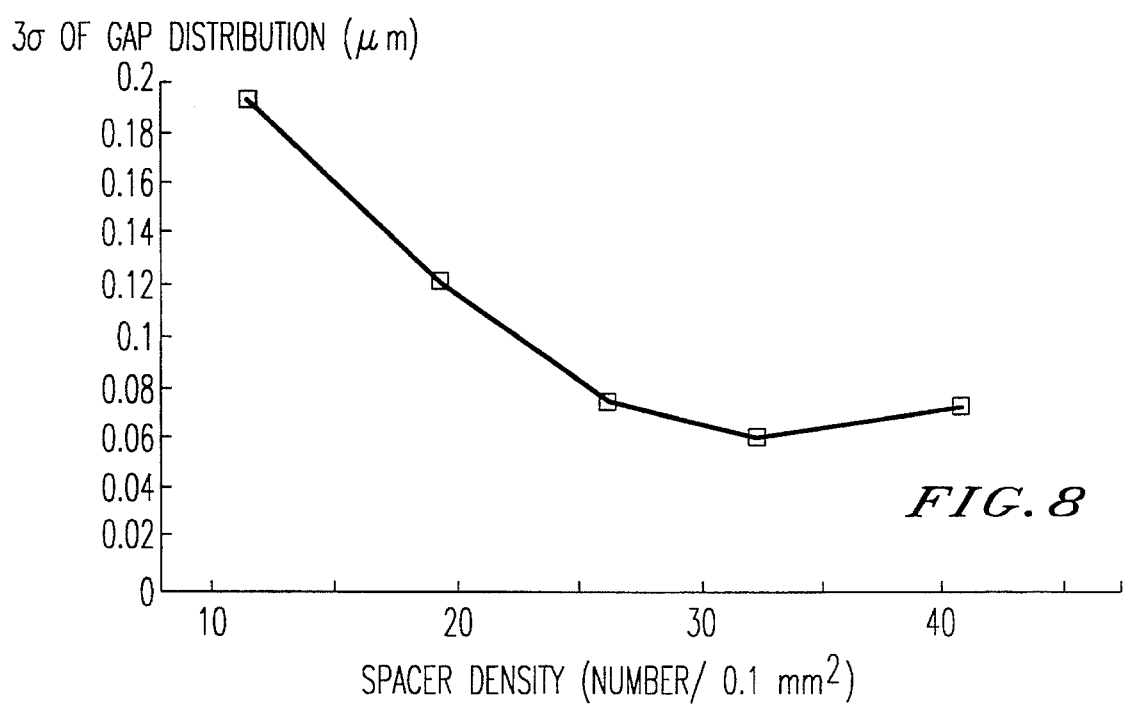
FIG. 8 is a graph representative of a relation between the spacer spraying density and the value $3\sigma$ of gap distribution and also useful for understanding the present invention.

Further, FIG. 8 shows a graph indicative of a relation between the amount or density of spacer per 0.1 mm$^2$ and a value 3 σ representative of an irregularity in cell gap distribution. The graph also indicates that when the spacer density per 0.1 mm$^2$ decreases to below twenty particles, the irregularity in cell gap increases. When the spacer density exceeds sixty particles/0.1 mm$^2$, defects in alignment are apt to occur with the spacer, serving as cores. Hence, the upper limit of spacer density should be fifty particles/0.1 mm$^2$. It follows that to maintain the cell gap stable and reduce the irregularity in cell gap, the spacer should preferably be sprayed in an amount greater than thirty particles/0.1 mm$^2$ and smaller than fifty particles/0.1 mm$^2$.

When speckles attributable to the particle size distribution of the spacer are conspicuous, the irregularity in the cell gap increases with the result that color speckles are apt to occur. In accordance with the present invention, use is made of a spacer whose particle size is 7.4 μm and standard deviation of particle size distribution is 0.2 μm. This is successful in reducing the irregularity in the cell gap due to, for example, the increase in particle size distribution speckles (e.g. standard deviation of 0.3 μm) and, therefore, in causing a minimum of color speckles to occur.

To achieve a uniform cell gap as stated above, the present invention proposes a unique method for the fabrication of an LCD, as follows. One of characteristic features of the method is a polymer film substrate which is easier to charge than a glass substrate. Experiments showed that a spacer sprayed onto the polymer film substrate is irregularly distributed in matching relation to a static electricity distribution which is determined by the presence/absence, shape and size of a transparent electrode; the irregularity is attributable to the area of electrodes formed on the surface to which the spacer is to be sprayed.

Specifically, when the area of transparent electrodes formed on the polymer film substrate is great, the amount of charge deposited on the substrate is small, and vice versa. It follows that the spacer will be uniformly sprayed if sprayed onto one of a pair of polymer film substrates which is greater than the other in the area of transparent electrodes. Generally, an LCD for segment display has one substrate assigned to segment electrodes and another substrate assigned to common electrodes. Usually, the substrate for common electrodes has a greater electrode area and a simpler electrode configuration than the substrate for segment electrodes. In this condition, the generation of distribution speckles can be prevented more positively when the spacer is sprayed onto the substrate for common electrodes than when it is sprayed onto the substrate for segment electrodes, due to the difference in the amount of static electricity.

Transparent electrodes are formed on the surface of the polymer film substrate onto which the spacer is to be sprayed. After an alignment coating has been formed on such a surface of the substrate, the surface is subjected to alignment treatment. In this condition, static electricity is deposited on the surface of the substrate. In accordance with the present invention, it was found that by confining the static electricity in a range of $0 \pm 100$ V, it is possible to eliminate the distribution speckles when the spacer is sprayed. To confine the static electricity to such a range, the substrate may be subjected to water absorption treatment after a rubbing step or to vapor cleansing after straining which is included in an intermediate rinsing step which follows the rubbing step.

Regarding the water absorption treatment, a substrate implemented as a polycarbonate (PC) or polyether sulfone (PES) film is caused to absorb water after a rubbing step. The water absorption reduces the specific volume resistivity of the substrate and, therefore, dissipates static electricity. A gas barrier layer and a protective layer generally laminated on the film substrate are also discharged. For the water absorption, the substrate may be left in a hot and humid atmosphere (e.g. 25° C. and 90%) for a predetermined period of time. Alternatively, steam may be sprayed onto the substrate, or the substrate may be immersed in water for a predetermined period of time.

Vapor cleansing is another effective implementation for discharging. It is a common practice with an LCD to effect an intermediate rinsing step after a rubbing step in order to remove impurities deposited on a substrate. The intermediate rinsing step, which is now implemented with water in place of flon, ends with a straining step. In the straining step, while an air knife removes water from the film substrate, the substrate is charged. To remove the charge, the rinsing step is followed by a vapor cleansing step so as to eliminate distribution speckles in the event of spacer spraying. For vapor cleansing, use may be made of an organic solvent having a low boiling point, e.g., Flon 113, isopropyl alcohol, or silicone surface active agent.

A specific example of the present invention is as follows. A pair of film substrates were each implemented by a 150 μm thick laminate polycarbonate film. 1.350 angstrom thick ITO electrodes were formed on the facing surfaces of the substrates. Then, electrode patterns having dot matrix display and character display were formed by photolithographic patterning, and segment electrodes and common electrodes were formed on the respective substrates. For an alignment agent, use was made of STX-24 available from Hitachi Kasei (Japan); the thickness was 1.500 angstroms. The substrates were baked at 120° C. and then rubbed to have a twist angle of 240°.

The rubbed substrates were rinsed by a water-based rinsing agent containing 3% of surface active agent and by ultrasonic wave rinsing. After shower ringing using pure water, the ITO electrode surfaces were strained by an air knife, while the other surfaces were strained by a water absorptive roll. After the rinsing step, static electricity was measured to be 1.100 V. The substrates were discharged by vapor cleansing using isopropyl alcohol. After the vapor cleansing, static electricity was measured to be −50 V.

A spacer was sprayed onto the substrate having the common electrodes at a density of thirty particles to fifty particles/0.1 mm$^2$. The spacer was implemented by an adhering type spacer AW-2 available from Shokubai Kagaku (Japan) and made up of SiO$^2$ beads and a thermoplastic resin covering them. The spacer sprayed onto the substrate was adhered by a 120° C. hot plate.

Subsequently, a seal constituted by a flexible epoxy resin was printed on the other substrate on which the segment electrodes were formed. Then, the two substrates were laid on each other and baked. Nematic liquid crystals, to which chiral nematic liquid crystals were added, were injected into the gap between the two substrates by vacuum injection. At this instant, the liquid crystal cell was subjected to vacuum heat processing beforehand (80° C., $0.3 \times 10^{-3}$ torr, and 2 hr) in order to remove moisture from the substrates.

In the event of liquid crystal injection, the cell was chucked by an elastic chucking body produced by, for example, adhering sponge or similar high elastic plastic resin to an aluminum plate. In this condition, the cell was held under a predetermined pressure which prevented the liquid crystals from being injected in more than a predetermined amount. After the injection, the filling hole of the cell was sealed by a UV (UltraViolet) setting type adhesive while the cell was held under the predetermined pressure.

A polarizer with a phase difference plate and a polarizer with a reflector were respectively adhered to opposite sides of the cell, thereby completing an LCD; The black-and-white STN (Super Twisted Nematic) type LCD of phase difference type fabricated by the above procedure had cell gap accuracy of ±0.1 μm and provided display with an extremely uniform tone.

As stated above, the present invention sets up a constant cell gap over the entire display area of an LCD and confines the irregularity in cell gap in 0.1 μm. This insures a uniform tone and eliminates color speckles. In addition, the method of the present invention reduces static electricity to deposit on a film substrate onto which a spacer is to be sprayed, thereby allowing the spacer to be uniformly sprayed in each unit area of 0.1 mm$^2$.

In summary, it will be seen that the present invention has various unprecedented advantages, as enumerated below.

(1) A spacer is scattered in liquid crystals at a density higher than 201 particles/mm$^2$ and lower than 800 particles/mm$^2$. This, coupled with the fact that the conventional gas barrier coatings are needless, allows a minimum of bubbles to be produced in the crystals. Hence, not only a display characteristic more desirable than the conventional characteristic is achievable, but also the cost is reduced due to the absence of gas barrier coatings.

(2) Since the spacer is affixed to a substrate, the deformation of the substrate is reduced. Further, even when the panel surface of the device is pressed, the spacer is prevented from moving, further reducing a change in cell gap. As a result, the production and growth of bubbles in the liquid crystals are further reduced.

(3) Since use is made of a color spacer, haze can be suppressed even when the spacer is sprayed in a greater amount. Hence, the display is sharp and further improves the display characteristic.

(4) The present invention is practicable not only with substrates whose air permeability is lower than 10 ml/m$^2$/24 h/atm/20° C., but also with substrates having air permeability higher than the same.

(5) The spacer has a particle size greater than 4 μm and smaller than 10 μm. This reduces a change in the thickness of a liquid crystal layer and, therefore, vacuum to develop therein, allowing a minimum of bubbles to occur. Particle sizes smaller than 4 μm are not desirable since they would change Δn.d of the cell (Δ:Δn.d of crystals:cell gap) and, therefore, the tone in response to a small change in gap. Since the value Δn.d of the cell constant at all times, a decrease in d necessarily results an increase in Δn. When Δn is increased, even a little change in d causes Δn.d and, therefore, the tone to change noticeably. This is particularly true in the case of the STN mode. In accordance with the present invention, since the standard deviation of the particle size distribution is less than 3% of the particle size, the irregularity in cell gap due to the increase in particle size distribution speckles can be reduced. As a result, color speckles sparingly occur. Standard deviations greater than 3% of the particle size would aggravate the irregularity in cell gap and, therefore, the irregularity in color.

(6) The spacer is sprayed onto one polymer film substrate on which electrodes occupy a greater area than on the other polymer film substrate. Hence, the amount of charge is reduced than when the spacer is sprayed onto the latter film substrate, so that the spacer can be uniformly sprayed onto the surface of the particular substrate. It follows that the cell gap is uniform enough to eliminate display speckles and other defects.

(7) The spacer is sprayed onto one of two polymer film substrates on which common electrodes are formed. The common electrodes occupy a greater area than segment electrodes formed on the other substrate and are simpler in configuration than the latter substrate. Therefore, the distribution speckles of the spacer are suppressed, compared to a case wherein the spacer is sprayed onto the other substrate having segment electrodes.

(8) The polymer film substrate onto which the spacer is to be sprayed is subjected to water absorption treatment before the spraying of the spacer. Alternatively, after such a substrate has been rinsed by a water-based ringing agent, it may be cleansed by vapor using an organic solvent having a low boiling point. This is successful in effectively dissipating static electricity to occur when the surface of the substrate is subjected to alignment treatment.

(9) After the polymer film substrate to carry the spacer has been discharged, the spacer is sprayed onto the substrate while the static electricity is controlled to 0±100 V. This causes a minimum of distribution speckles to occur when the spacer is sprayed.

Various modifications will become possible for those skilled in the art after receiving the teachings of the present disclosure without departing from the scope thereof.

What is claimed is:

1. A method of producing an LCD having at least a first polymer film substrate and a second polymer film substrate, comprising the steps of:

forming transparent electrodes on each of respective facing surfaces of said first and second polymer film substrates, a first of the facing surfaces of said first polymer film substrate having a greater area occupied by the transparent electrodes than a second of the facing surfaces of the second polymer film substrate;

covering said transparent electrodes with an alignment coating;

spraying a spacer between said facing surfaces of said first and second polymer film substrates onto the first face of the first polymer film substrate; and filling a gap between said facing surfaces of said first and second polymer film substrates which is formed when said LCD has edges thereof adhered together with liquid crystals.

2. The method as claimed in claim 1, wherein said first polymer film substrate comprises a substrate on which common electrodes are formed.

3. The method as claimed in claim 1, further comprising a step of subjecting the first polymer film substrate to a water absorption treatment before the step of spraying said spacer.

4. The method as claimed in claim 1, further comprising steps of rinsing the first polymer film substrate by a water-based rinsing agent and then vapor cleansing the first polymer film substrate using organic solvent, before the step of spraying said spacer.

5. The method as claimed in claim 1, further comprising steps of dissipating a charge on the first polymer film substrate before spraying said spacer, and a static electricity of 0±100 V existing on said first polymer film substrate at a time of spraying said spacer.

* * * * *